(12) United States Patent
Shim

(10) Patent No.: US 10,693,546 B2
(45) Date of Patent: Jun. 23, 2020

(54) APPARATUS AND METHOD FOR SPARSIFYING CHANNEL USING BEAMFORMING

(71) Applicant: Seoul National University R&DB Foundation, Seoul (KR)

(72) Inventor: Byonghyo Shim, Seoul (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 0 days.

(21) Appl. No.: 16/463,855

(22) PCT Filed: Nov. 24, 2017

(86) PCT No.: PCT/KR2017/013521
§ 371 (c)(1),
(2) Date: May 24, 2019

(87) PCT Pub. No.: WO2018/097645
PCT Pub. Date: May 31, 2018

(65) Prior Publication Data
US 2019/0341987 A1 Nov. 7, 2019

(30) Foreign Application Priority Data
Nov. 25, 2016 (KR) .................. 10-2016-0158359

(51) Int. Cl.
*H04B 7/06* (2006.01)
*H04L 5/00* (2006.01)
(Continued)

(52) U.S. Cl.
CPC ......... *H04B 7/0617* (2013.01); *H04L 5/0051* (2013.01); *H04L 25/03987* (2013.01); *H04L 27/2628* (2013.01); *H04W 24/10* (2013.01)

(58) Field of Classification Search
CPC ................. H04B 7/0617; H04W 24/10; H04L 25/03987; H04L 5/0051; H04L 27/2628
See application file for complete search history.

(56) References Cited

U.S. PATENT DOCUMENTS 7,039,001 B2 * 5/2006 Krishnan .............. H04L 25/023
370/203
8,102,934 B2 1/2012 Fujii
(Continued)

FOREIGN PATENT DOCUMENTS

JP 2009-049604 A 3/2009
KR 10-2010-0098854 A 9/2010
(Continued)

OTHER PUBLICATIONS

International Search Report dated Mar. 27, 2018 for International Application No. PCT/KR2017/013521 and its English translation.
(Continued)

*Primary Examiner* — Curtis A Alia

(57) ABSTRACT

The present prevent relates to a method of sparsifying a channel using beamforming in a wireless communication system, the method including inserting pilot symbols into resources allocated among resource elements constituting a time-frequency grid; calculating beamforming weights for sparsifying a beamformed time-domain channel; and beamforming frequency-domain channels of a plurality of antennas mapping the pilot symbols by using the beamforming weights.

12 Claims, 11 Drawing Sheets

(51) Int. Cl.
*H04L 25/03* (2006.01)
*H04L 27/26* (2006.01)
*H04W 24/10* (2009.01)

(56) References Cited

U.S. PATENT DOCUMENTS

| | | | |
|---|---|---|---|
| 8,208,397 B2 | 6/2012 | Cheng et al. | |
| 8,217,835 B2 | 7/2012 | Ko et al. | |
| 8,537,911 B2 | 9/2013 | Sayana et al. | |
| 8,693,568 B2 | 4/2014 | Lee et al. | |
| 8,923,110 B2 | 12/2014 | Cheng et al. | |
| 8,923,148 B2 | 12/2014 | Cheng et al. | |
| 9,654,187 B2 | 5/2017 | Hui et al. | |
| 2008/0084817 A1* | 4/2008 | Beckman | H04L 5/0048 370/210 |
| 2014/0211644 A1* | 7/2014 | Giannakis | H04W 16/14 370/252 |
| 2014/0293904 A1 | 10/2014 | Dai et al. | |
| 2015/0341101 A1* | 11/2015 | Park | H04L 5/0048 370/329 |
| 2016/0036488 A1* | 2/2016 | Tessier | H04B 1/7117 375/148 |

FOREIGN PATENT DOCUMENTS

| | | |
|---|---|---|
| KR | 10-2011-0057893 A | 6/2011 |
| KR | 10-2012-0007539 A | 1/2012 |
| KR | 10-1567477 B1 | 11/2015 |
| KR | 10-2015-0135781 A | 12/2015 |

OTHER PUBLICATIONS

Ji, Hyoung Ju et al., "Compress Sensing Assisted Channel Training and Time-sparse Precoding in IoT Systems", 2016 Summer Symposium of the Korean Institute of Communications and Information Sciences, vol. 60, Jun. 2016, pp. 521-522.

Shim, Byong Hyo et al., "Reconstruction of Sparse Vector", Information & Communications Magazine Open Lecture, vol. 33, No. 6 (supplement No. 3), May 2016, pp. 34-42.

Non-final Office Action for Korean Application No. 10-2016-0158359 dated May 30, 2018.

Non-final Office Action for Korean Application No. 10-2016-0158359 dated Dec. 14, 2018.

\* cited by examiner

APPARATUS AND METHOD FOR SPARSIFYING CHANNEL USING BEAMFORMING

CROSS-REFERENCE TO RELATED APPLICATIONS

This application is a National Phase Entry of International Application No. PCT/KR2017/013521, filed on Nov. 24, 2017, which claims priority and benefits of Korean Application No. 10-2016-0158359, filed on Nov. 25, 2016, the content of which is incorporated herein by reference in its entirety.

TECHNICAL FIELD

The present invention relates to a channel estimation technique, and more particularly, to an apparatus and method for reducing overhead and channel estimation complexity due to pilot transmission/reception for acquiring channel state information (CSI) in the Internet of Things (IoT).

BACKGROUND ART

Recently, there has been increased interest in IoT technology capable of information sharing between devices, sensors, and machines through connection to the Internet as the future technology. IoT technology enables new services and applications to provide environment monitoring, automatic measurement, and smart sensing functions through devices with connectivity added thereto, thereby contributing to the improvement of human life.

To this end, wireless systems must be able to support a variety of needs such as high transmission rates, low latency, and enhanced reliability and energy efficiency. That is, one consideration in designing an IoT system is that IoT devices must be designed with significant hardware limitations and power budgets. For example, IoT devices need to use a narrowband RF chain, a small number of antennas, a low-capacity memory, and a low-power signal processing unit. Also, since systems must often switch to a sleep mode in order to save energy, it is not possible to continuously measure time and frequency channels. Furthermore, since pilot signals are uniformly allocated in the frequency domain on current wireless systems, it is not possible to feed back CSI of the entire system band using samples acquired from narrow-band measurements. In this situation, the systems cannot obtain the benefit of frequency selection scheduling for the entire band using partial CSI, and thus cannot support various types of devices.

In order to solve this problem, that is, in order to reduce pilot overhead and improve channel estimation performance, Compressed Sensing (CS) based on pilot transmission and channel estimation techniques has been studied in recent years. Through this technology, recovery performance may be enhanced by using a common sparse signal structure for time-domain channel vectors. Although a CS-based time-domain channel estimation algorithm is effective in reducing pilot overhead, the pilot overhead increases linearly with the number of antennas. In fact, the performance of the CS algorithm depends solely on channel vector sparsity for each antenna, and thus pilot overhead and computational complexity increase in proportion to the number of antennas. Therefore, the CS algorithm is not suitable for IoT environments.

DETAILED DESCRIPTION OF THE INVENTION

Technical Problem

According to an embodiment, there are provided an apparatus and method for sparsifying a channel using beamforming, the apparatus and method being capable of improving channel estimation performance by decreasing pilot overhead and computational complexity so that the apparatus and method may be applied to a low-cost Internet-of-Things (IoT) system.

Technical Solution

According to an embodiment, a method of sparsifying a channel using beamforming at a transmitting end in a wireless communication system includes inserting pilot symbols into resources allocated among resource elements constituting a time-frequency grid, calculating beamforming weights for sparsifying a beamformed time-domain channel, and beamforming frequency-domain channels of a plurality of antennas mapping the pilot symbols by using the beamforming weights.

According to another embodiment, the calculating of the beamforming weights includes designing the beamforming weights such that undesired non-zero taps are all removed in the beamformed time-domain channel, which is formed by performing an inverse discrete Fourier transform on the beamformed frequency-domain channel.

According to still another embodiment, the calculating of the beamforming weights includes performing a discrete Fourier transform on a time-domain channel vector and then applying a relationship between a channel gain and an antenna index; deriving a result of the application as a computed value for the time-domain channel vector and a value $\Omega(k)$; and deriving the beamforming weights as a computed value for a pseudo inverse matrix of the value $\Omega(k)$ and a matrix in which values corresponding to the undesired non-zero taps in the time-domain channel vector are all 0s on the basis of a computational expression that is switched to a beamformed frequency-domain channel vector when the beamforming weights are applied to the computed value for the time-domain channel vector and the value $\Omega(k)$.

According to still another embodiment, the beamforming includes multi-beamforming the frequency-domain channels of the plurality of antennas mapping the plurality of pilot symbols by using the beamforming weights.

According to still another embodiment, the beamforming includes multi-beamforming the frequency-domain channels of the plurality of antennas mapping the plurality of pilot symbols by using the beamforming weights, and each of the beamforming weights is a pseudo inverse matrix of the value $\Omega(k)$.

The present invention relates to a method of estimating a time domain pilot channel at a receiving end of a wireless communication system, the method including measuring a received beamformed pilot channel; and estimating a time-domain channel from a value obtained by measuring a beamformed pilot.

According to another embodiment, the estimating of the time-domain channel includes acquiring multiple measurement vectors (MMVs) from the value obtained by measuring the beamformed pilot; and detecting a tap having the largest energy value in the acquired MMVs and estimating a beamformed time-domain channel vector.

According to still another embodiment, when a plurality of beamformed pilot channels are measured through the measuring, the estimating of the time-domain channel includes acquiring multiple measurement vectors (MMVs) from a value obtained by stacking measurement values of the plurality of beamformed pilots; and repeating estimation of a beamformed time-domain channel vector for detecting a tap having the largest energy value in the acquired MMVs a number of times corresponding to the number of beamformed pilot channels.

The present invention relates to an apparatus for sparsifying a channel using beamforming, the apparatus including a plurality of antennas; a pilot mapping unit configured to insert pilot symbols into resources allocated among resource elements constituting a time-frequency grid; a weight calculation unit configured to calculate beamforming weights for sparsifying a beamformed time-domain channel; and a beam generating unit configured to multiply frequency-domain channels mapping the pilot symbols by the beamforming weights input from the weight calculation unit and then transmit the frequency-domain channels through the plurality of antennas.

MODE OF THE INVENTION

Figure 1:
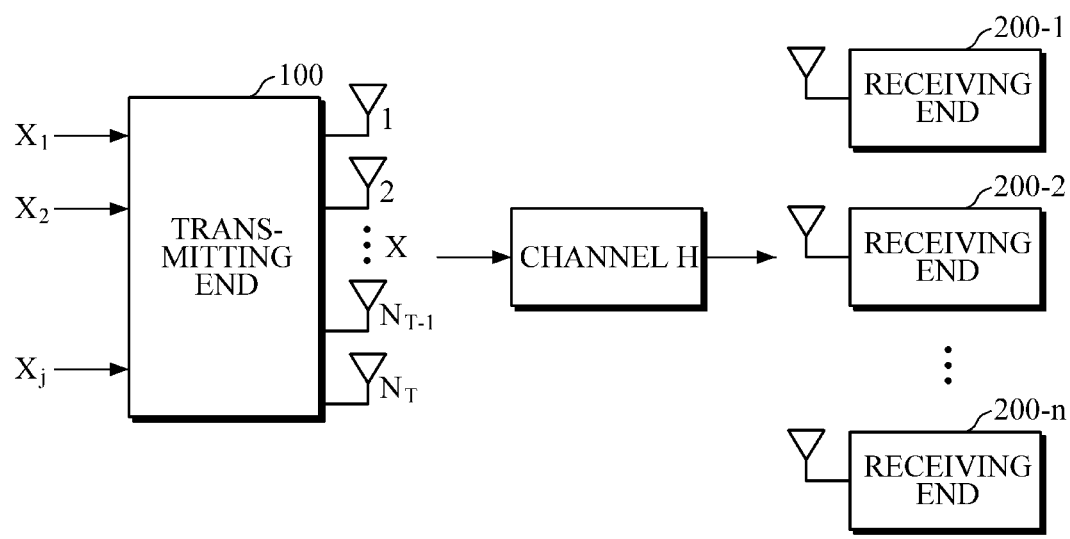
FIG. 1 shows an example block diagram of a downlink IoT system according to the present invention.

Details of other embodiments are included in the detailed description and drawings. Advantages and features of the described technique, and implementation methods thereof will be clarified through following embodiments described with reference to the accompanying drawings. Like reference numerals refer to like elements throughout.

Relational terms such as first, second, and the like may be used for describing various elements, but the elements should not be limited by the terms. These terms are used only to distinguish one element from another. As used herein, the singular forms "a," "an," and "the" are intended to include the plural forms as well, unless the context clearly indicates otherwise. Furthermore, when one part is referred to as "comprising" (or "including" or "having") other elements, it should be understood that the part can comprise (or include or have) only those elements or other elements as well as those elements unless specifically described otherwise. Moreover, each of terms such as "unit" and "module" used herein denotes an element for performing at least one function or operation, and may be implemented in hardware, software or a combination of hardware and software.

FIG. 1 shows an example block diagram of a downlink IoT system according to the present invention.

Referring to FIG. 1, the downlink IoT system includes a transmitting end 100 such as a base station and a plurality of receiving ends 200-1, 200-2, . . . , 200-n, which are mobile stations such as an IoT device. The transmitting end 100 has a plurality of ($N_T$) antennas, and each of the receiving ends 200-1, 200-2, . . . , 200-n has a single antenna. Here, typically, some bands $B_u$ [Hz] of the entire system bandwidth $B_s$ [Hz] are allocated to the receiving ends 200-1, 200-2, . . . , 200-n. When a system uses a single frequency bandwidth, 1.4 MHz within a bandwidth of 20 MHz may be allocated to an eMTC device, and 180 kHz may be allocated to an NB-IoT.

Figure 2A:
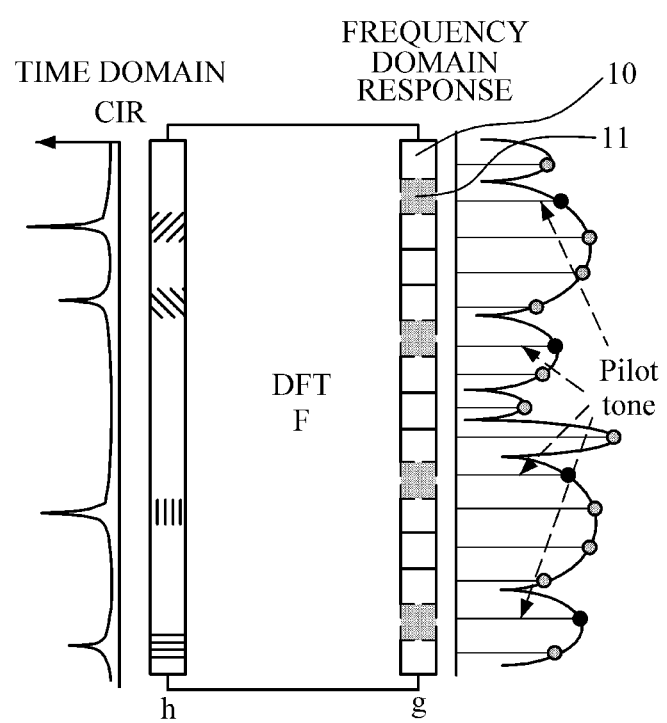
FIG. 2A is a diagram showing the relationship between a frequency response and a time-domain channel vector.
Figure 2B:
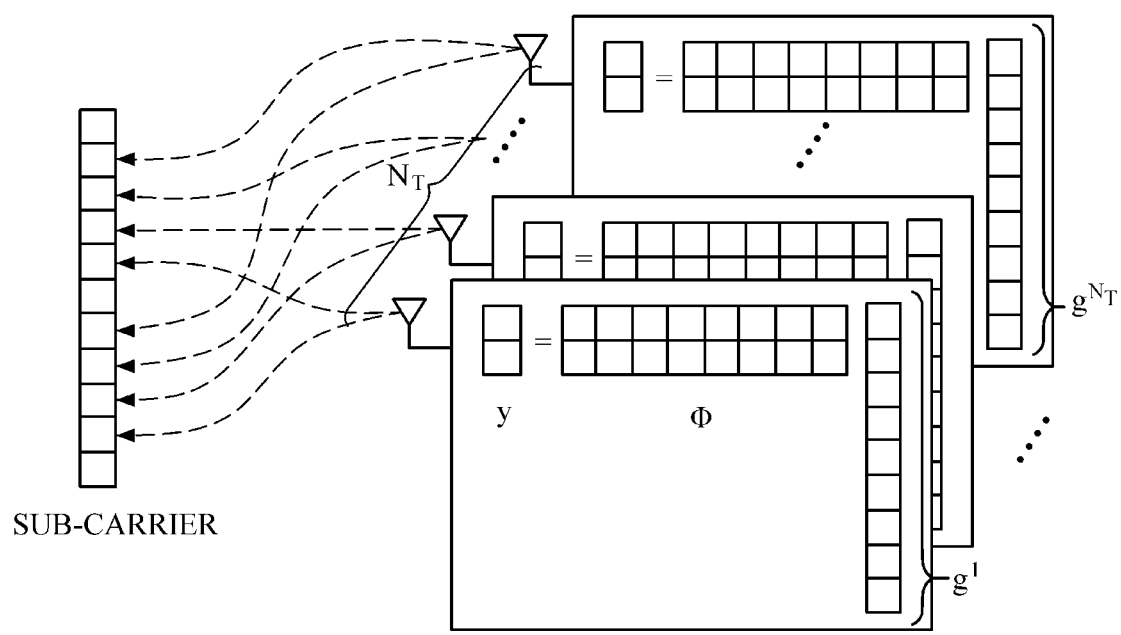
FIG. 2B is a diagram for describing transmission of pilots using multiple antennas.

Meanwhile, in order to perform channel estimation, data demodulation, and channel state information (CSI) feedback in an OFDM-based system, the transmitting end 100 inserts pilot symbols into a time-frequency grid as shown in FIG. 2A and then transmits the pilot symbols through a plurality of antennas as shown in FIG. 2B.

FIG. 2A is a diagram showing the relationship between a frequency response and a time-domain channel vector. Referring to FIG. 2A, blocks 10 represent resource elements (REs), and shading blocks 11 represent REs for pilot symbols.

FIG. 2B is a diagram for describing transmission of pilots using multiple antennas.

When it is assumed that $y_n^i \in \mathbb{C}^{N_P \times 1}$ is a receiving pilot vector in the frequency domain extracted from an ith antenna and an nth time symbol shown in FIG. 2B, $y_n^i$ may be expressed by Equation 1 below:

$$y_n^i = \mathrm{diag}(p_n^i)\Phi_n^i g_n^i + z_n^i \qquad \text{[Equation 1]}$$

where $p_n^i \in \mathbb{C}^{N_P \times 1}$ is a pilot symbol vector, $\Phi_n^i \in \mathbb{R}^{N_P \times N_F}$ is a selection matrix having each row in which one element is 1 and the other elements are 0s, $z_n^i \in \mathbb{C}^{N_P \times 1}$ is an additive white Gaussian noise (AWGN) ($z_n^i \sim \mathcal{CN}(0, \sigma_w^2 I_{N_p})$), and $g_n^i \in \mathbb{C}^{N_P \times 1}$ is a frequency-domain channel vector.

Meanwhile, as shown in FIG. 2A, the relationship between the frequency-domain channel vector $g_n^i$ and a time-domain channel vector $h_n^i = [h_{n,1}^i, \ldots, h_{n,N_F}^i] \in \mathbb{C}^{N_F \times 1}$ may be expressed by Equation 2 below:

$$g_n^i = F h_n^i \qquad \text{[Equation 2]}$$

where $F \in \mathbb{C}^{N_F \times N_F}$ is a discrete Fourier transform (DFT) matrix.

In order to express features of the channel vector h, it is assumed that there are $N_{sp}$ sub-paths for K-cluster and each cluster. When base station antennas have a linear array structure (a one-dimensional linear array or a two-dimensional uniform planar array) and a receiving end antenna is a single antenna, a channel for each antenna may be expressed using an angle of departure (AoD). A timevarying channel tap $h_m^i$ and a delay bin m of an ith antenna may be expressed by Equation 3 below:

$$h_m^i = \frac{1}{N_T} \sum_{l=1}^{N_{sp}} \sqrt{\frac{h_m^i}{N_{sp}}} e^{j\phi_m} e^{j\kappa(i-1)\sin\theta_{m,l}} \text{ where } \kappa = \frac{2\pi}{\lambda}$$ [Equation 3]

is a wave number, $\phi_m$ is a random phase of an mth element, $\theta_{m,l} = \theta_m + \Delta\theta_l$ is an AoD of sub-paths of an mth cluster in $\Delta\theta_l \sim \mathcal{N}(0, \sigma_m^2)$, and $\sigma_m$ is the standard deviation of angular spread for m=1, ..., K.

In the present invention, it is generally assumed that the support of the channel vector $h^i$ is the same for all the antennas. That is, for i and j=1, ..., $N_T$, supp($h^i$)=supp($h^j$). Compared to a signal transmission distance in a base station with a typical multi-antenna geometry, the antennas have relatively small scales, and thus channels associated with different transmitting antenna-receiving antenna pairs share a common support.

However, when the number of antennas is large on the above-described system, orthogonal pilot transmission cannot be a desirable approach because of pilot overhead and computational complexity of signal processing operations.

Therefore, according to an embodiment of the present invention, the transmitting end 100 shown in FIG. 1 transmits multi-beamformed pilots (hereinafter referred to as beams) in order to reduce the pilot overhead. That is, according to the present invention, a pilot signal is transmitted after a predetermined beam pattern is applied. Thus, multiple beams may be transmitted in different beam directions at the same time. The dimension of the channel vector may be effectively reduced, and thus the pilot overhead and computational complexity associated with the channel estimation may be considerably reduced.

When a pilot signal is transmitted with no modification, a channel vector in an angular domain is expressed as $[h^1 \ldots h^{N_T}]^T = \Sigma_l e_l h_l(\phi_l)^*$, and $e_l = 1$ and $h_l(\phi_l) = [1 \ e^{-j2\pi\kappa\phi_l} \ldots e^{-j2\pi(N_T-1)\kappa\phi_l}]^T$ are spatial signatures of a transmitter. Here, it is assumed that $\phi_l$ is the direction of an ith path and all the paths have the same delay. When the beamforming of a pilot in a direction $\phi_j$ is performed, a beamforming weight is set to $v = h_l(\phi_j)$. The resulting beamformed channel may be expressed using one or, at most, several dominant taps $w_l(\phi_l)^T h_l(\phi_l) \approx 0$ (i≠j).

In fact, the present invention is characterized in designing a beamforming weight in order to sparsify a beamformed time-domain channel vector $\tilde{h}$. That is, when the number of taps of h and the number of non-zero taps are $N_{cir}$ and K, respectively, the following Equation 4 may be obtained by stacking the channel vectors for the antennas.

$$h_{all} = \begin{bmatrix} h^1 \\ \vdots \\ h^{N_T} \end{bmatrix} \text{ with } \|h_{all}\|_0 = N_T K$$ [Equation 4]

where $\|x\|_0$ is the number of non-zero elements in x.

After time-domain sparsification beamforming (TDSB) according to the present invention is applied, a beamforming channel vector $\tilde{h}^i$ is acquired, and Equation 5 below is acquired by stacking the acquired $\tilde{h}^i$.

$$\tilde{h}_{all} = \begin{bmatrix} \tilde{h}^1 \\ \vdots \\ \tilde{h}^K \end{bmatrix} \text{ with } \|\tilde{h}_{all}\|_0 = K.$$ [Equation 5]

Accordingly, the channel estimation problem is changed from a problem of finding $N_T K$ sparse vectors from $N_T N_{cir}$ to a problem of finding K sparse vectors from $KN_{cir}$.

Figure 3:
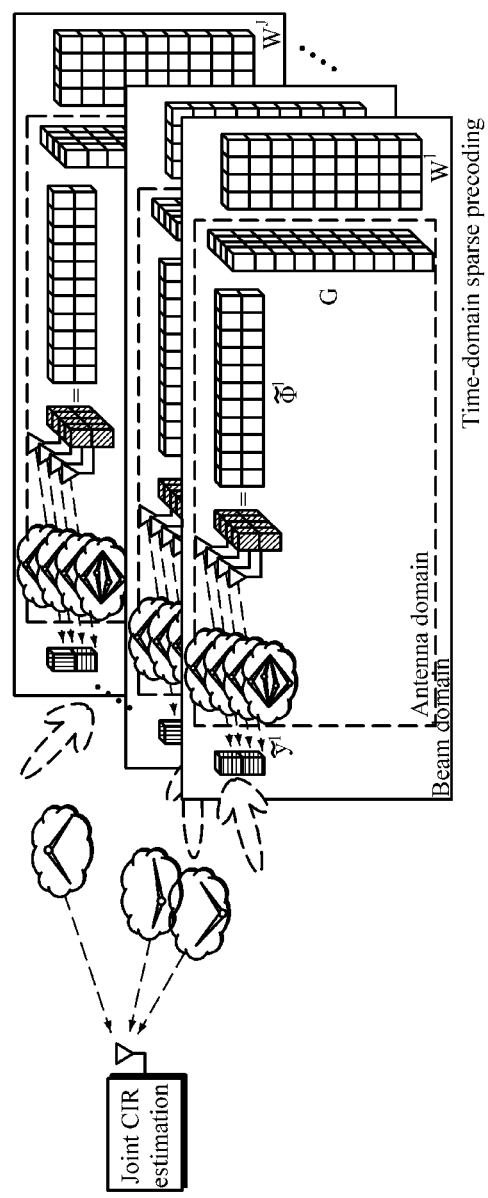
FIG. 3 is a conceptual view for describing sparsification of channels using beamforming according to the present invention.

However, unlike a general method in which a pilot signal is transmitted without modification, a pilot signal is beamformed and then transmitted as shown in FIG. 3 according to an embodiment of the present invention.

FIG. 3 is a view showing pilot transmission sparsification according to the present invention.

Referring to FIG. 3, by applying the beamforming weight to a plurality of antennas, pilot transmission may be controlled in the beam domain. Therefore, it can be seen that signals are transmitted as a single beam even when the signals are transmitted through the plurality of antennas, and thus a channel dimension is decreased to "1."

That is, it is an object of the present invention to minimize the number of non-zero entries in the time-domain channel vector, thereby significantly reducing pilot overhead and also improving channel estimation performance.

Then, in order to facilitate an understanding of the present invention, a time domain system model in which pilot beamforming is not performed in a transmitting end will be described first, and then an apparatus and method for sparsifying a channel using beamforming according to an embodiment of the present invention will be described in detail.

Considering a time-domain channel impulse response (CIR) vector of an ith antenna, a pilot observation $y_n^i$ for a general wireless system may be expressed by Equation 6 below:

$$y_n^i = \text{diag}(p_n^i)\Phi_n^i g_n^i + z_n^i$$

$$= \text{diag}(p_n^i)\Phi_n^i F \begin{bmatrix} h_n^i \\ 0_{N_F - N_{cir}} \end{bmatrix} + z_n^i$$

$$= \text{diag}(p_n^i)\Phi_n^i F \Pi h_n^i + z_n^i,$$ [Equation 6]

where $\Pi \in \mathbb{R}^{N_F \times N_C}$ is a matrix configuration of a selection matrix in which only one for each column is 1 and the others are 0s. When $U_n^i = \text{diag}(p_n^i)\Phi_n^i F \Pi$, Equation 6 above may be expressed by Equation 7 below:

$$y_n^i = U_n^i h_n^i + z_n^i.$$ [Equation 7]

In multiple wireless environments, a channel may be expressed using a small number of taps K'. That is, K' is much smaller than the length of the CIR vector $N_{cir}$. Since $h_n^i$ is a sparse vector and thus may be efficiently discovered using the Compressed Sensing (CS) technique. However, channel estimation in a time domain system model in which the pilot beamforming is not performed is performed for each antenna, and pilot overhead and computational complexity increase in proportion to the number of transmission antennas.

Then, an apparatus and method for sparsifying channels using beamforming according to an embodiment of the present invention will be described in detail with reference to FIGS. 4A to 5.

Figure 4A:
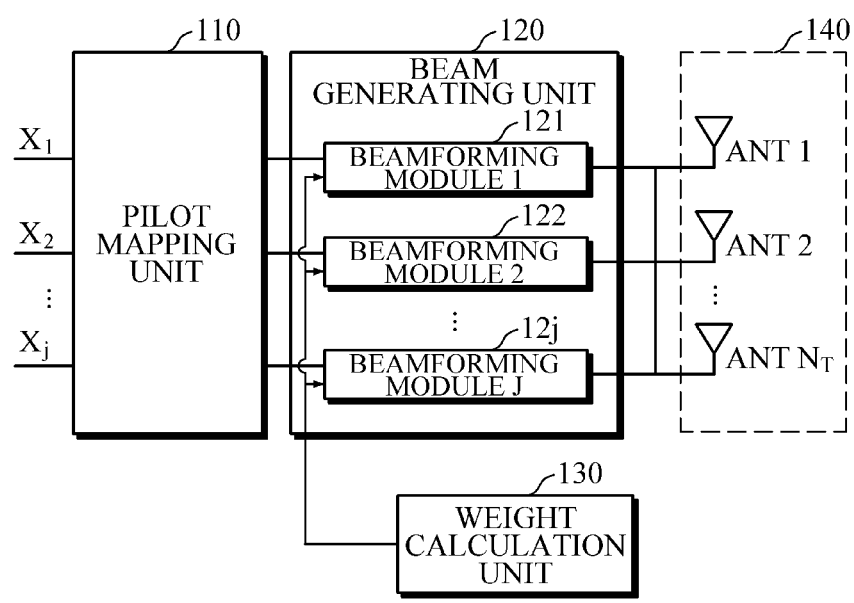
FIGS. 4A and 4B are block diagrams of an apparatus for sparsifying channels using beamforming according to an embodiment of the present invention.
Figure 4B:
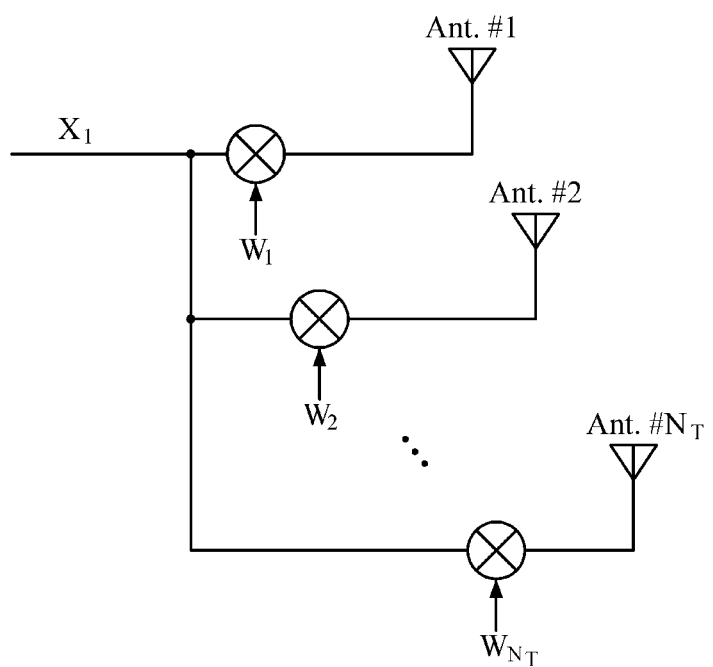

FIGS. 4A and 4B are block diagrams of an apparatus for sparsifying channels using beamforming according to an embodiment of the present invention.

Referring to FIG. 4A, an apparatus for sparsifying channels using beamforming (the transmitting end 100 of FIG. 1) includes a pilot mapping unit 110, a beam generating unit 120, a weight calculation unit 130, and a plurality of antennas 140. Here, other well-known detailed elements constituting the transmitting end of the wireless communication system may obscure the gist of the present invention. Therefore, the elements will not be shown in the drawings, and a detailed description thereof will be omitted.

The pilot mapping unit 110 inserts a pilot symbol of FIG. 2 into an allocated resource among resource elements constituting a time-frequency grid.

The beam generating unit 120 multiplies frequency-domain channels to which the pilot symbol is mapped by beamforming weights input from the weight calculation unit 130 and then performs transmission through the plurality of antennas. For example, referring to FIG. 4B, a frequency domain pilot symbol X1 multiplied by a weight W1 is transmitted through Ant #1, a frequency domain pilot symbol X1 multiplied by a weight W2 is transmitted through Ant #2, and a frequency domain pilot symbol X1 multiplied by a weight Wnt is transmitted through Ant # NT. In this case, a beam is formed of the symbols and transmitted.

According to an embodiment of the present invention, the beam generating unit 120 includes a plurality of beamforming modules 121, 122, . . . , 12j for performing beamforming on each of the plurality of pilot symbols. Each of the beamforming modules 121, 122, . . . , 12j has a structure as shown in FIG. 4B.

The weight calculation unit 130 designs the beamforming weights to remove all undesired non-zero taps in a beamformed time-domain channel obtained by performing an inverse discrete Fourier transform on a beamformed frequency-domain channel. According to an embodiment of the present invention, when the beam generating unit 120 includes a plurality of beamforming modules 121, 122, . . . , 12j, the weight calculation unit 130 calculates and then outputs beamforming weights to be input to the beamforming modules 121, 122, . . . , 12j.

A method of designing beamforming weights in the weight calculation unit 130 will be described in detail below.

After the beam generating unit 120 applies a beamforming weight $w_n(k)=[w_n^1(k) \ldots w_n^{N_T}(k)]^T$, the beamformed (scalar) channel may be expressed by Equation 8 below:

$$\tilde{g}_n(k) = w_n^T(k) \begin{bmatrix} g_n^1(k) \\ \vdots \\ g_n^{N_T}(k) \end{bmatrix}. \quad \text{[Equation 8]}$$

When $\tilde{h}_n^i=[\tilde{h}_{n,1}^i, \ldots, \tilde{h}_{n,N_{cir}}^i]^T$ is a time domain CIR vector of the beamformed pilot, a receiving vector $\tilde{y}_n \in \mathbb{C}^{\tilde{N}_P \times 1}$ after all carriers are collected may be expressed by Equation 9 below:

$$\tilde{y}_n = \mathrm{diag}(\tilde{p}_n)\tilde{\Phi}_n \begin{bmatrix} \tilde{g}_n(1) \\ \vdots \\ \tilde{g}_n(N_F) \end{bmatrix} + \tilde{z}_n \quad \text{[Equation 9]}$$

$$= \mathrm{diag}(\tilde{p}_n)\tilde{\Phi}_n \mathrm{diag}(W_n G_n) + \tilde{z}_n$$

$$= \mathrm{diag}(\tilde{p}_n)\tilde{\Phi}_n F \begin{bmatrix} \tilde{h}_n^i \\ 0_{N_F-N_{cir}} \end{bmatrix} + \tilde{z}_n$$

where $\tilde{p}_n \in \mathbb{C}^{\tilde{N}_P \times 1}$ is a pilot symbol vector, $\tilde{\Phi}_n \in \mathbb{R}^{\tilde{N}_P \times N_F}$ is a selection matrix, $\tilde{z}^i \in \mathbb{C}^{\tilde{N}_P \times 1}$ is an AWGN ($\tilde{z}_n \sim \mathcal{CN}(0, \sigma_w^2 I_{\tilde{N}_P})$), $G_n=[g_n^1 \ldots g_n^{N_T}]^T \in \mathbb{C}^{N_T \times N_F}$ is a matrix configuration of frequency-domain channel vectors of $N_T$ antennas, and $W_n=[w_n(1) \ldots w_n(N_F)]^T \in \mathbb{C}^{N_F \times N_T}$ is a matrix configured by stacking beamforming vectors of all sub-carriers.

The weight calculation unit 130 designs a beamforming weight matrix $W_n$ to minimize the cardinality of the beamformed channel vector $\tilde{h}_n$ as shown in Equation 10 below:

$$W_n = \underset{\tilde{W}_n}{\mathrm{argmin}} \|\tilde{h}_n\|_0 \quad \text{[Equation 10]}$$

$$= \underset{\tilde{W}_n}{\mathrm{argmin}} \left\| \frac{1}{N_F} F^* \mathrm{diag}(\tilde{W}_n G_n) \right\|_0.$$

According to an embodiment of the present invention, it is possible to remove all undesired non-zero taps by using elaborately designed beamforming, and thus it is possible to sparsify pre-coded time-domain channel vectors.

For example, when the support of $h_n^i$ (the index of a non-zero element) is $\Gamma=\{n_1, n_2, n_3\}$ and the number $N_T$ of antennas is 4, a frequency-domain channel for an ith antenna and a kth sub-carrier is expressed by Equation 11 below:

$$g_n^i(k) = \sum_{n=1}^{N_F} h_{n,n}^i e^{j\frac{2\pi k(n-1)}{N_F}} \quad \text{[Equation 11]}$$

$$= h_{n,n_1}^i e^{j\frac{2\pi k n_1}{N_F}} + \begin{bmatrix} h_{n,n_2}^i & h_{n,n_3}^i \end{bmatrix} \begin{bmatrix} e^{j\frac{2\pi k n_2}{N_F}} \\ e^{j\frac{2\pi k n_3}{N_F}} \end{bmatrix}.$$

When the relationship between a channel gain and an antenna index i is $h_i = h_1 e^{j(i-1)\kappa \sin \theta_n}$, Equation 12 below may be obtained.

$$g_n^i(k) = \begin{bmatrix} 1 & 1 & 1 \\ e^{j\kappa\sin\theta_{n_1}} & e^{j\kappa\sin\theta_{n_2}} & e^{j\kappa\sin\theta_{n_3}} \\ e^{j2\kappa\sin\theta_{n_1}} & e^{j2\kappa\sin\theta_{n_2}} & e^{j2\kappa\sin\theta_{n_3}} \\ e^{j3\kappa\sin\theta_{n_1}} & e^{j3\kappa\sin\theta_{n_2}} & e^{j3\kappa\sin\theta_{n_3}} \end{bmatrix} \begin{bmatrix} h_{n,n_1}^1 e^{j\frac{2\pi k n_1}{N_F}} \\ h_{n,n_2}^1 e^{j\frac{2\pi k n_2}{N_F}} \\ h_{n,n_3}^1 e^{j\frac{2\pi k n_3}{N_F}} \end{bmatrix} \quad \text{[Equation 12]}$$

$$\Omega(k) = \begin{bmatrix} 1 & 1 & 1 \\ e^{j\kappa\sin\theta_{n_1}} & e^{j\kappa\sin\theta_{n_2}} & e^{j\kappa\sin\theta_{n_3}} \\ e^{j2\kappa\sin\theta_{n_1}} & e^{j2\kappa\sin\theta_{n_2}} & e^{j2\kappa\sin\theta_{n_3}} \\ e^{j3\kappa\sin\theta_{n_1}} & e^{j3\kappa\sin\theta_{n_2}} & e^{j3\kappa\sin\theta_{n_3}} \end{bmatrix}.$$

By denoting $$\bar{h}_n = \begin{bmatrix} h_{n,n_1}^1 e^{j\frac{2\pi k n_1}{N_F}} \\ h_{n,n_2}^1 e^{j\frac{2\pi k n_2}{N_F}} \\ h_{n,n_3}^1 e^{j\frac{2\pi k n_3}{N_F}} \end{bmatrix},$$

Equation 13 below may be obtained.

$$g_n^i(k) = \Omega(k)\bar{h}_n.$$ [Equation 13]

Here, by applying the beamforming vector $w_n^i(k)$, the beamformed channel may be expressed by Equation 14 below:

$$\tilde{g}_n(k) = w_n^T(k) g_n(k)$$ [Equation 14]
$$= w_n^T(k)\Omega(k)\bar{h}_n$$

where the dimension of the matrix $\Omega(k)$ is $N_T \times K$ and is full ranked. Accordingly, there is a solution when the number $N_T$ is greater than or equal to K, which is the number of non-zero elements in $h_n^i$. For example, when all taps of $h_n^i$ except an n1 st position are desired to be removed, the beamforming vector should be designed, as shown in Equation 15, in order to remove all undesired non-zero taps n2 and n3.

$$w_n^T(k) = \Omega(k)^\dagger \begin{bmatrix} 1 \\ 0 \\ 0 \end{bmatrix}$$ [Equation 15]

where $\Omega^\dagger$ is a pseudo inverse matrix of $\Omega$ ($\Omega^\dagger = (\Omega^T\Omega)^{-1}\Omega^T$). After the beamforming is performed, a beamformed frequency domain (scalar) channel $\tilde{g}(k)$ is acquired by Equation 16 below.

$$\tilde{g}_n(k) = \sum_{i=1}^{N_T} w_n^j(k) h_{n,t_1}^i e^{j\frac{2\pi k t_1}{N_F}}, K \leq N_T.$$ [Equation 16]

Last, $\tilde{h}_n = [0 \ldots 0 \ h_{n_1} \ 0 \ldots 0]^T$ may be obtained by transforming the beamformed frequency-domain channel vector $\tilde{g}_n$ into the time domain.

Meanwhile, as described above, in order to use beam selection diversity, the beam generating unit 120 may have multiple beamforming modules 121, 122, ..., 12j and may be expanded to support multiple beams at the same time. To this end, the weight calculation unit 130 designs j beamforming weights $W_n^j$ as shown in Equation 17 in order to minimize the cardinality of $\tilde{h}_n^j$.

$$\{W_n^j, J\} = \underset{\bar{W}_n, J}{\arg\min} \|\tilde{h}_n^j\|_0 \text{ for } j = 1, \ldots, J$$ [Equation 17]

$$= \underset{\bar{W}_n, J}{\arg\min} \left\| \frac{1}{N_F} F^* \text{diag}(W_n^j G_n) \right\|_0$$

s.t. $supp(\tilde{h}_n^j) \neq supp(\tilde{h}_n^{j'})$ for $j \neq j'$, where j'=1, ..., J.

In order to guarantee that the non-zero elements of the time-domain channel vectors are non-overlapping support vectors distinct between the time-domain channel vectors of the beams, the weight calculation unit 130 sums K beamforming weights in a matrix $V_n(k) = [w_n^1(k) \ldots w_n^K(k)]$ in a kth sub-carrier index.

The time-domain channel vectors of the collected beams may be expressed by Equation 18 below:

$$[\tilde{h}_n^1 \ldots \tilde{h}_n^J] = \frac{1}{N_F} F^* [\text{diag}(W_n^1 G_n) \ldots \text{diag}(W_n^J G_n)]$$ [Equation 18]

$$= \frac{1}{N_F} F^* \begin{bmatrix} V_n(1)\Omega(1)\bar{h}_n \\ \vdots \\ V_n(N_F)\Omega(N_F)\bar{h}_n \end{bmatrix}..$$

Accordingly, the weight calculation unit 130 may acquire Equation 19 below, which is a product of a pseudo inverse matrix of $\Omega(k)$ as a pre-coding weight, in each sub-carrier k.

$$V_n(k) = \Omega(k)^\dagger \text{ for } K \leq N_T.$$ [Equation 19]

According to an embodiment of the present invention, the pilot overhead is proportional to the number of beams, that is, the number of non-zero elements in the time-domain channel vector. That is, as the number of antennas increases, the overhead is significantly decreased compared to a conventional technique in which the pilot overhead is proportional to the number of antennas.

Figure 5:
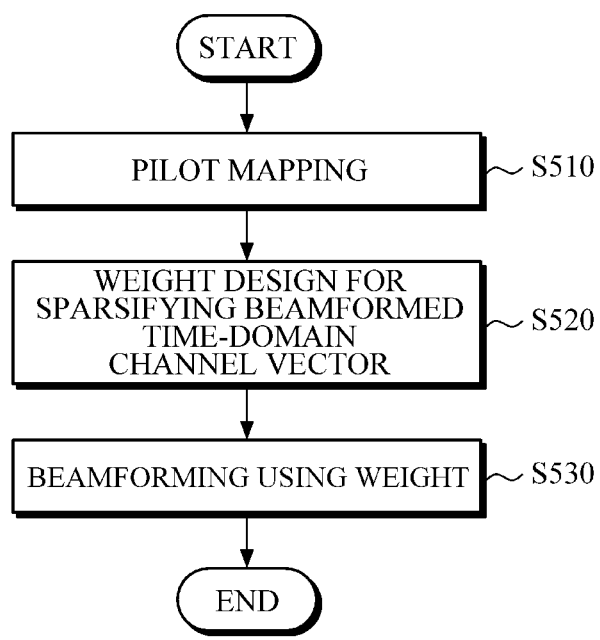
FIG. 5 is a flowchart for describing a method of sparsifying channels using beamforming according to an embodiment of the present invention.

FIG. 5 is a flowchart for describing a method of sparsifying channels using beamforming according to an embodiment of the present invention.

Referring to FIG. 5, an apparatus 100 for sparsifying channels using beamforming (hereinafter referred to as a "transmitting end") inserts a pilot symbol into an allocated resource among resource elements constituting a time-frequency grid, as shown in FIG. 2A (S510).

Then, the transmitting end 100 calculates a beamforming weight for sparsifying a beamformed time-domain channel (S520). That is, referring to Equation 10, the beamforming weight is designed such that all desired non-zero taps are removed in the beamformed time-domain channel, which is formed by performing an inverse discrete Fourier transform on a beamformed frequency-domain channel.

In detail, referring to Equation 11, the transmitting end 100 performs a discrete Fourier transform on a time-domain channel vector and then applies a relationship between a channel gain and an antenna index to derive an applied result as a computed value for the time-domain channel vector and a value $\Omega(k)$, as shown in Equation 12.

Then, referring to Equation 13 and Equation 14, when the beamforming weight is applied to the computed value for the time-domain channel vector and the value $\Omega(k)$, the transmitting end 100 derives the beamforming weight from a computational formula for obtaining a beamformed frequency-domain channel vector as a value obtained by computing a pseudo inverse matrix of the value $\Omega(k)$ and a matrix in which values corresponding to all the undesired non-zero taps in the time-domain channel vector are 0s, as shown in Equation 15.

Then, the transmitting end 100 beamforms the beamforming weights derived as described above by applying frequency-domain channels of a plurality of antennas mapping pilot symbols. According to an embodiment, the transmitting end 100 may multi-beamform the frequency-domain channels of the plurality of antennas mapping the plurality of pilot symbols by using the beamforming weights. While the frequency-domain channels of the plurality of antennas mapping the plurality of pilot symbols are multi-beamformed using the beamforming weights, the beamforming weights may be calculated as the pseudo inverse matrix of the value $\Omega(k)$, referring to Equation 19.

Figure 6:
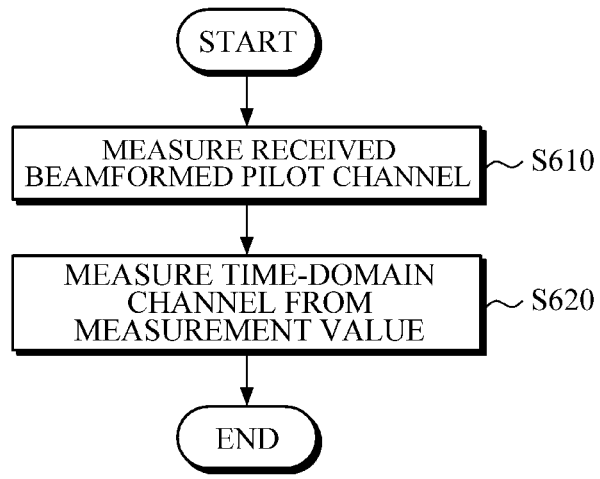
FIG. 6 is a flowchart for describing a method of estimating a time-domain pilot channel at a receiving end in a wireless communication system according to an embodiment of the present invention.

FIG. 6 is a flowchart for describing a method of estimating a time-domain pilot channel at a receiving end in a wireless communication system according to an embodiment of the present invention.

Referring to FIG. 6, a receiving end 200 measures a received beamformed pilot channel (S610). Here, a received beamformed pilot measurement value $\tilde{y}_n$ may be expressed by Equation 20 below:

$$\tilde{y}_n = \text{diag}(\tilde{p}_n)\tilde{\Phi}_n F \begin{bmatrix} \tilde{h}_n \\ 0_{N_F - N_{cir}} \end{bmatrix} + \tilde{z}_n \qquad \text{[Equation 20]}$$

$$= \tilde{U}_n \tilde{h}_n + \tilde{z}_n,$$

where $\tilde{U}_n = \text{diag}(\tilde{p}_n)\tilde{\Phi}_n F\Pi$. In channel vector estimation, it is assumed that the locations of dominant components in a CIR vector remain unchanged during an interference time.

Then, the receiving end 200 estimates a time-domain channel from a value obtained by measuring the beamformed pilot (S620).

In detail, when the number of pilot symbols in a local block is set to L, the receiving end 200 acquires multiple measurement vectors (MMVs) of such beamformed pilots $\bar{y}_n = [\tilde{y}_{n-L} \ldots \tilde{y}_n]^T$. Then, a channel vector $d_{n,k} \in \mathbb{C}^{L\tilde{N}_P \times L}$ as expressed by Equation 21 below is used to find non-zero elements from the MMVs.

$$d_{n,k} = [(\tilde{h}_{n-L})_k \ldots (\tilde{h}_n)_k]^T \text{ for } k=1, \ldots N_{cir} \qquad \text{[Equation 21]}$$

where $(\cdot)_k$ denotes a kth component of pre-coded time-domain channel vectors. $\bar{y}_n$ may be rewritten as Equation 22 below:

$$\bar{y}_n = [\Sigma_{n,1} \ldots \Sigma_{n,N_{cir}}]\begin{bmatrix} s_1 d_{n,1} \\ \ldots \\ s_{N_{cir}} d_{n,N_{cir}} \end{bmatrix} + \begin{bmatrix} \bar{z}_{n,1} \\ \ldots \\ \bar{z}_{n,N_{cir}} \end{bmatrix} \qquad \text{[Equation 22]}$$

where $\Sigma_{n,k}$ forms a realigned sensing matrix of a signal vector $d_{n,k}$. Since the number of non-zero elements in $\tilde{h}_n$ is 1, $d_{n,\hat{k}}$ and the index of the dominant tap $\hat{k}$ may be estimated as Equation 23 below:

$$\hat{k} = \arg\max_k \|\Sigma_{n,k}\bar{y}_n\|_2^2 \qquad \text{[Equation 23]}$$

$$\hat{d}_{n,\hat{k}} = E[d_{n,\hat{k}}\bar{y}_n^H]E^{-1}[\bar{y}_n\bar{y}_n^H]\bar{y}_n$$

$$= [R_n\Sigma_{n,\hat{k}}^H][R_n\Sigma_{n,\hat{k}}\Sigma_{n,\hat{k}}^H + \sigma_z^2 I]^{-1}\bar{y}_n$$

where $R_n$ is a covariance matrix of the channel tap. As a result, a beamformed time-domain channel vector is calculated by Equation 24 below:

$$\hat{h}_n = [(\hat{d}_{n,1})_L \ldots (\hat{d}_{n,N_{cir}})_L]^T \qquad \text{[Equation 24]}$$

According to an embodiment, the above-described time-domain pilot channel estimation method may be expanded to channel estimation of multiple beamformed pilots.

That is, in step S610, when $\tilde{y}_n^j$ is a received beamformed pilot measurement value of a jth beamformed pilot, stacked beamformed pilots may be expressed as $\hat{y}_n = [\tilde{y}_n^1 \ldots \tilde{y}_n^J]^T$.

Subsequently, in step S620, for L symbols of a local block, the MMVs of the J beamformed pilots may be expressed as Equation 25 below:

$$\bar{y}_n = \begin{bmatrix} \hat{y}_{n-L} \\ & \ddots \\ & & \hat{y}_n \end{bmatrix}. \qquad \text{[Equation 25]}$$

In order to find non-zero elements in the channel vector, a new channel vector $d_{n,j,k} \in \mathbb{C}^{LN_P \times L}$ is defined as Equation 26 below:

$$d_{n,j,k} = [(\tilde{h}_{n-L})_{j,k} \ldots (\tilde{h}_n)_{j,k}]^T \qquad \text{[Equation 26]}$$

for $j=1, \ldots J$ and $k=1, \ldots N_{cir}$ where $(\cdot)_{j,k}$ denotes kth components of a jth beamforming CIR vector. Equation 25 may be written as Equation 27 below:

$$\bar{y}_n = [\Sigma_{n,1,1} \ldots \Sigma_{n,J,N_{cir}}]\begin{bmatrix} s_{b_1 c_1} d_{n,1,1} \\ \ldots \\ s_{b_J c_{N_{cir}}} d_{n,J,N_{cir}} \end{bmatrix} + \begin{bmatrix} \bar{z}_{n,1,1} \\ \ldots \\ \bar{z}_{n,J,N_{cir}} \end{bmatrix} \qquad \text{[Equation 27]}$$

where $\Sigma_{n,j,k}$ forms a realigned sensing matrix of a signal vector $d_{n,j,k}$. In order to determine whether or not the location includes energy, one support vector s joints two sub-scripts with channel vector estimation (a beam support vector $b = [b_1 \ldots b_J]^T$ and a tap support vector $c = [c_1 \ldots c_{N_{cir}}]^T$).

For example, $s_{b_j c_k} = 1$ denotes a case where a kth component of the channel vector is a support of a jth beamformed pilot. In each iteration, indices of components having the maximum energy are selected in the channel vector in the order of the maximum energy indices. On the basis of the index of the selected tap component and a beam index thereof, the support vector s is updated as expressed in Equation 28 below:

$$s_{b_j c_k} = 1, s_{b_j c_m} = 0 \text{ for } m \neq k, s_{b_l c_k} = 0 \text{ for } l \neq t. \qquad \text{[Equation 28]}$$

After the support vector is updated, a selection beam and a tap component are removed from beam sets for discovery and tap sets for the next iteration.

The iterations are repeated until all K dominants components are identified. In an ith iteration, a channel vector estimation value of an ith beamformed pilot is acquired as expressed in Equation 29 below:

$$\hat{h}_n^l = [(\hat{d}_{n,i,1}^{(l)})_L \ldots (\hat{d}_{n,i,N_{cir}}^{(l)})_L]^T. \qquad \text{[Equation 29]}$$

Finally, the effect of channel sparsification using the aforementioned beamforming of the present invention will be described with reference to FIGS. 7 to 9.

In the present invention, an IoT system in which is $B_s = 20$ MHz was considered, and the DFT size $N_F = 2048$ of a sub-carrier space of 15 KHz was considered. An IoT device uses $B_u = 150$ KHz, which is the size of 12 sub-carriers having a Doppler frequency of 7 Hz. The maximum delay spread of the multipath channel is assumed to be 0.467 μs, and $N_{cir}$=144. A duration of a time symbol is 7.2 μs, and an interval between adjacent pilot symbols is 5 ms.

It is assumed that components in which K of the channel vector is 5 is a random dominant having certain energy. For pilot overhead, subcarriers $N_T$ K are arbitrarily positioned between $B_s$ for pilots without modification, and subcarriers JǨ are used between $B_u$ for beamformed pilots. The position of a receiving end band $B_u$ for all measurement values may be arbitrarily selected within $B_s$.

Figure 7:
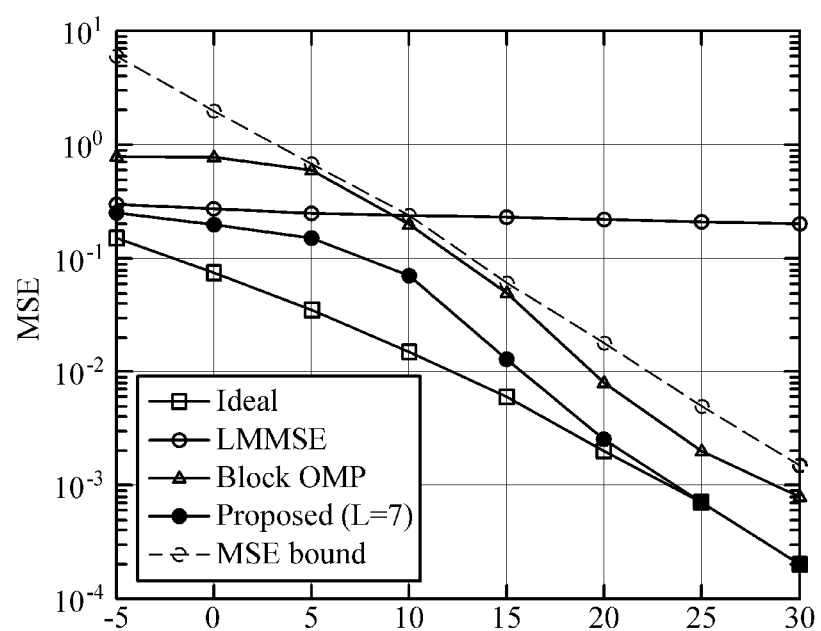
FIG. 7 is a graph for mean square error (MSE) performance comparison between channel vector estimation and general channel estimation according to the present invention.

FIG. 7 is a graph for mean square estimation (MSE) performance comparison between channel vector estimation and general channel estimation according to the present invention.

Referring to FIG. 7, it can be seen that the channel estimation performance according to the present invention is better than the channel estimation performance according to a general scheme. This means that the performance of the time-domain channel vector recovery is improved after the TDSB is applied according to the present invention.

Since the receiving end has only a few samples in the frequency domain, normal linear filters do not work correctly. Also, since the symbol pilots are also located within a narrow bandwidth of $B_s$, a normal CS algorithm works inefficiently.

Figure 8:
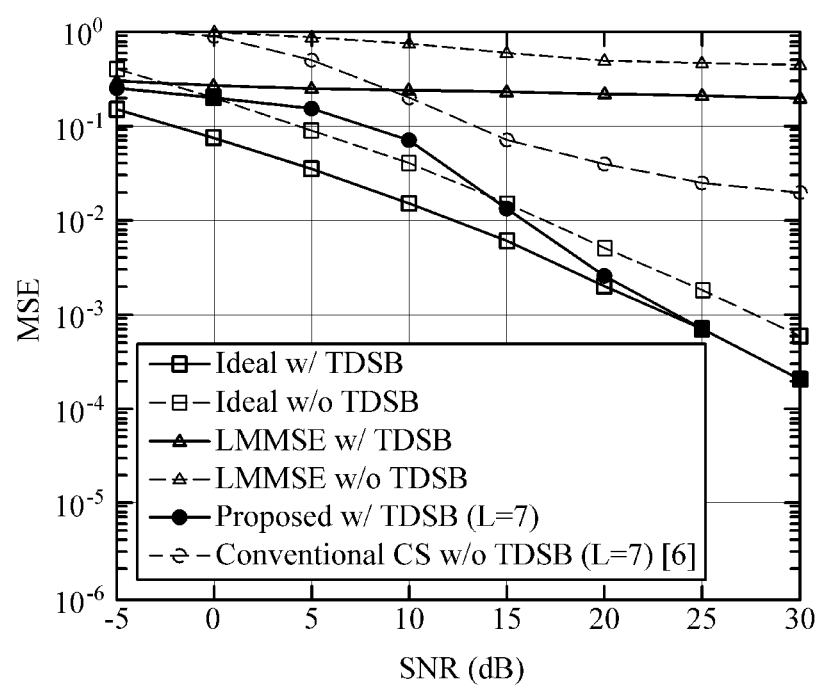
FIG. 8 is a graph for MSE performance comparison depending on whether time-domain sparsification beamforming (TDSB) according to the present invention is performed.

FIG. 8 is a graph for MSE performance comparison depending on whether TDSB according to the present invention is performed.

Referring to FIG. 8, the number of taps more significantly decreased when the TDSB is performed than when the TDSB is not performed. Accordingly, when a signal-to-noise ratio (SNR) is high, the MSE is at most 20 dB. That is, the MSE decreases as the number of taps decreases. This result shows that the complexity is reduced by beam-specific estimation using TDSB of the present invention instead of by measurement of a channel vector for each antenna.

Figure 9:
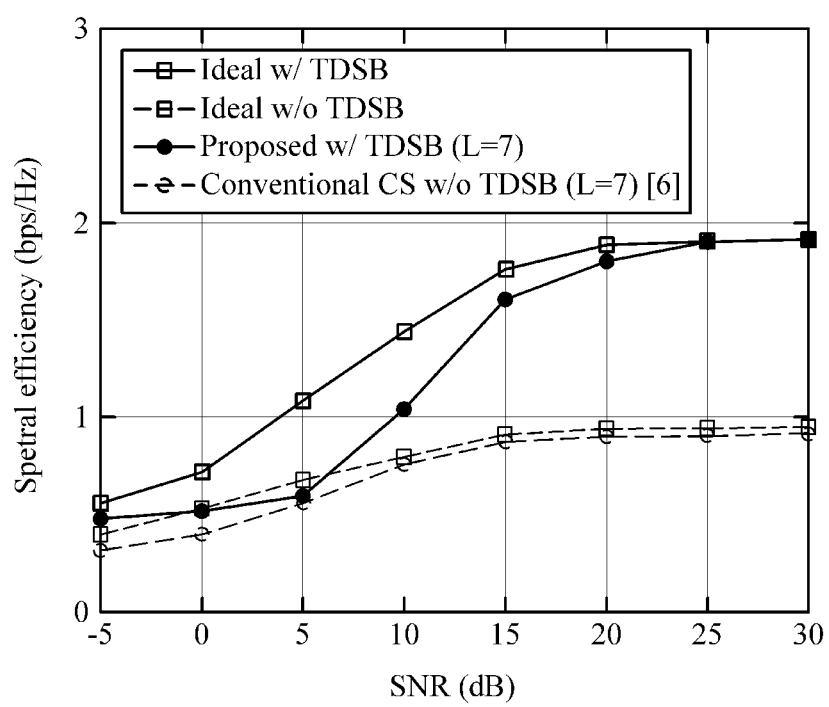
FIG. 9 is a graph showing spectral efficiency considering pilot overhead according to the present invention.

FIG. 9 is a graph showing spectral efficiency considering pilot overhead according to the present invention.

Referring to FIG. 9, the pilot overhead increases in proportion to the number of transmission antennas in a typical method while the pilot overhead is proportional to the number of pilot symbols according to the present invention. That is, considering pilot overhead, spectral efficiency with TDSB according to the present invention is superior in performance to pilot transmission without TDSB. In the related art, the pilot overhead is proportional to the number of antennas as the number of antennas increases. However, according to the present invention, pilot overhead is proportional to the number of beams, that is, the number of non-zero elements in the time-domain channel vector. Thus, it is possible to significantly reduce the pilot overhead compared to the related art.

Also, according to the present invention, only a time-domain channel vector of beams such as the number of non-zero elements is estimated, instead of a frequency channel being estimated for each antenna. Thus, it is possible to mitigate the computational complexity for the channel estimation at a receiving side. Meanwhile, embodiments of the present invention can be implemented as computer-readable codes in a computer-readable recording medium. The computer-readable recording medium includes any kinds of recording devices for storing data which can be thereafter read by a computer system.

Examples of the computer-readable recording medium include a read-only memory (ROM), a random-access memory (RAM), a CD-ROM, a magnetic tape, a floppy disk, an optical data storage device, and also a carrier wave (such as data transmission through the Internet). The computer-readable recording medium can also be distributed over network-coupled computer systems so that the computer-readable code is stored and executed in a distributed fashion. Functional programs, codes, and code segments for realizing embodiments of the present invention can be easily construed by programmers skilled in the art to which the present invention pertains.

It will be understood by those skilled in the art that various changes in form and details may be made therein without departing from the spirit and scope of the present disclosure. It is therefore to be understood that the above-described embodiments are illustrative in all aspects and not restrictive.

The invention claimed is:

1. A method of sparsifying a channel using beamforming at a transmitting end of a wireless communication system, the method comprising:
   inserting pilot symbols into resources allocated among resource elements constituting a time-frequency grid;
   calculating beamforming weights for sparsifying a beamformed time-domain channel; and
   beamforming frequency-domain channels of a plurality of antennas mapping the pilot symbols by using the beamforming weights,
   wherein the calculating of the beamforming weights comprises:
   performing a discrete Fourier transform on time-domain channel vectors and then applying a relationship between channel gains and antenna indices;
   deriving a result of the application as computed values for the time-domain channel vectors and a first matrix; and
   deriving the beamforming weights as computed values for a pseudo inverse matrix of the first matrix.

2. The method of claim 1, wherein the calculating of the beamforming weights comprises designing the beamforming weights such that undesired non-zero taps are all removed in the beamformed time-domain channels, which is formed by performing an inverse discrete Fourier transform on the beamformed frequency-domain channel.

3. The method of claim 2, wherein the deriving the beamforming weights comprises deriving the beamforming weights as the computed values for the pseudo inverse matrix of the first matrix and a matrix in which values corresponding to the undesired non-zero taps in the time-domain channel vectors are all 0s on the basis of a computational expression that is switched to beamformed frequency-domain channel vectors when the beamforming weights are applied to the computed values for the time-domain channel vectors and the first matrix.

4. The method of claim 1, wherein the beamforming comprises multi-beamforming the frequency-domain channels of the plurality of antennas mapping the plurality of pilot symbols by using the beamforming weights.

5. The method of claim 3, wherein the beamforming comprises multi-beamforming the frequency-domain channels of the plurality of antennas mapping the plurality of pilot symbols by using the beamforming weights, and each of the beamforming weights is a pseudo inverse matrix of the first matrix.

6. A method of estimating a time domain pilot channel at a receiving end of a wireless communication system, the method comprising:
   measuring a received beamformed pilot channel; and
   estimating time-domain channels from a value obtained by measuring a beamformed pilot, wherein the estimating of the time-domain channels comprises:
acquiring multiple measurement vectors (MMVs) from the value obtained by measuring the beamformed pilot; and
detecting a tap having the largest energy value in the acquired MMVs and estimating beamformed time-domain channel vectors.

7. The method of claim 6, wherein when a plurality of beamformed pilot channels are measured during the measuring, the estimating of the time-domain channels comprises:
acquiring multiple measurement vectors (MMVs) from a value obtained by stacking measurement values of the plurality of beamformed pilots; and
repeating estimation of a beamformed time-domain channel vectors for detecting a tap having the largest energy value in the acquired MMVs multiple times corresponding to the number of beamformed pilot channels.

8. An apparatus for sparsifying a channel using beamforming, the apparatus comprising:
a plurality of antennas;
a pilot mapping unit configured to insert pilot symbols into resources allocated among resource elements constituting a time-frequency grid;
a weight calculation unit configured to calculate beamforming weights for sparsifying a beamformed time-domain channel; and
a beam generating unit configured to multiply frequency-domain channels mapping the pilot symbols by the beamforming weights input from the weight calculation unit and then transmit the frequency-domain channels through the plurality of antennas,
wherein the weight calculation unit is further configured to perform a discrete Fourier transform on time-domain channel vectors and then apply a relationship between channel gains and antenna indices; derives a result of the application as computed values for the time-domain channel vectors and a first matrix; and derive the beamforming weights as computed values for a pseudo inverse matrix of the first matrix.

9. The apparatus of claim 8, wherein the weight calculation unit designs the beamforming weights such that undesired non-zero taps are all removed in the beamformed time-domain channels, which is formed by performing an inverse discrete Fourier transform on a beamformed frequency-domain channel.

10. The apparatus of claim 8, wherein the weight calculation unit derives the beamforming weights as computed values for a pseudo inverse matrix of the first matrix and a matrix in which values corresponding to the undesired non-zero taps in the time-domain channel vectors are all 0s on the basis of a computational expression that is switched to beamformed frequency-domain channel vectors when the beamforming weights are applied to the computed values for the time-domain channel vectors and the first matrix.

11. The apparatus of claim 8, wherein,
the beam generating unit includes a plurality of beamforming modules for beamforming the plurality of pilot symbols,
the weight calculation unit calculates and outputs beamforming weights to be input to the beamforming modules, and
the plurality of beamforming modules multiply the frequency-domain channels mapping the pilot symbols by the beamforming weights input from the weight calculation unit and then transmit the frequency-domain channels through the plurality of antennas.

12. The apparatus of claim 10, wherein,
the beam generating unit includes a plurality of beamforming modules for beamforming the plurality of pilot symbols,
the weight calculation unit calculates and outputs the beamforming weights to be input to the beamforming modules using a pseudo inverse matrix of the first matrix, and
the plurality of beamforming modules multiply the frequency-domain channels mapping the pilot symbols by the beamforming weights input from the weight calculation unit and then transmit the frequency-domain channels through the plurality of antennas.

* * * * *